United States Patent [19]
Walworth

[11] 3,968,651
[45] July 13, 1976

[54] TRANS-CLUTCH TORQUE CONVERTER

[76] Inventor: Ralph Franklin Walworth, 226 13th Ave., NE., St. Petersburg, Fla. 33701

[22] Filed: July 2, 1975

[21] Appl. No.: 592,417

[52] U.S. Cl. ............................................. 60/487
[51] Int. Cl.² .......................................... F16D 31/04
[58] Field of Search .................................. 60/487

[56] References Cited
UNITED STATES PATENTS

| | | | |
|---|---|---|---|
| 3,404,584 | 10/1968 | Trautmann | 60/487 X |
| 3,808,814 | 5/1974 | Macy | 60/487 |

FOREIGN PATENTS OR APPLICATIONS

| | | | |
|---|---|---|---|
| 1,073,751 | 3/1954 | France | 60/487 |
| 324,438 | 1/1930 | United Kingdom | 60/487 |

*Primary Examiner*—Allan D. Herrmann
*Attorney, Agent, or Firm*—Oldham & Oldham Co.

[57] ABSTRACT

A multi-speed trans-clutch torque converter having pairs of input and output gears positioned on parallel input and output shafts in a closed chamber, a plurality of pairs of idler gears journalled on the shafts between the input and output gears, means to supply pressure liquid to the driven input gears for recirculation in the closed chamber by the output gears, and means to move pairs of said idler gears axially to engage said input or said output gears and retain them in their given positions.

10 Claims, 10 Drawing Figures

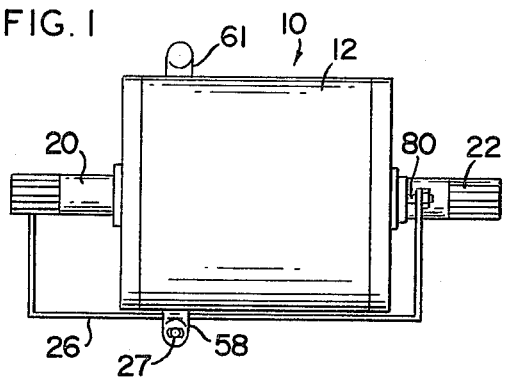
FIG. 1
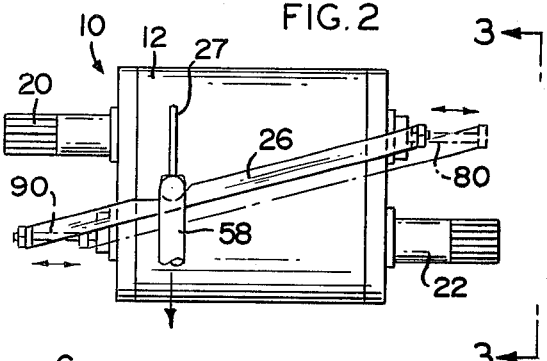
FIG. 2
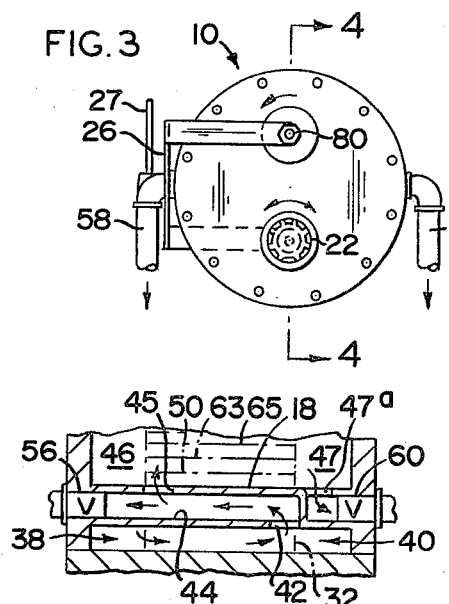
FIG. 3
FIG. 7
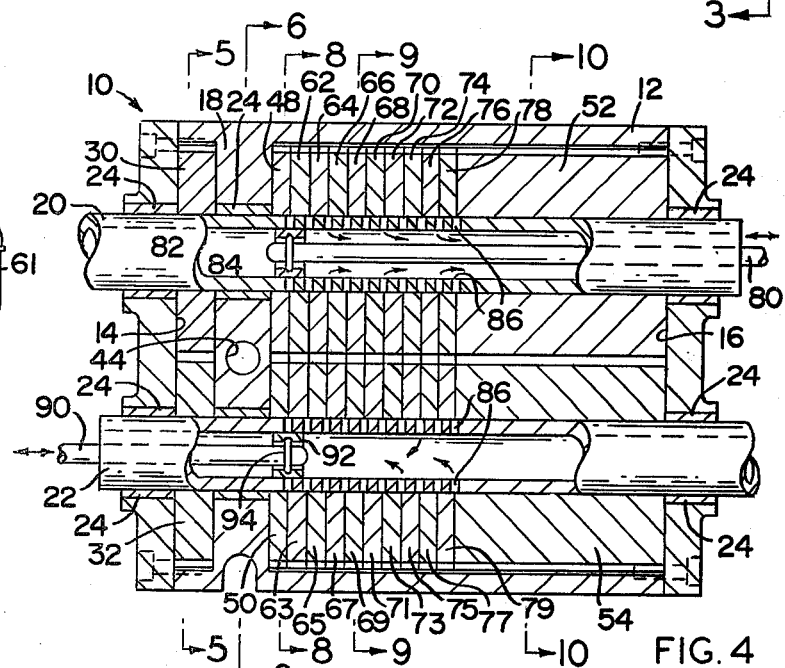
FIG. 4
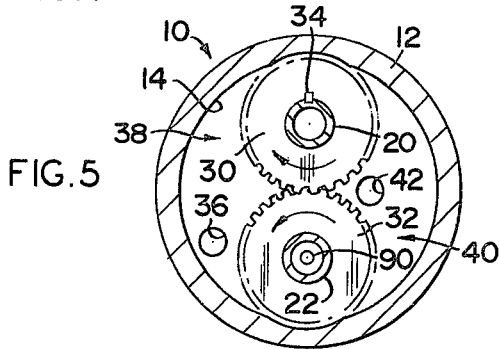
FIG. 5
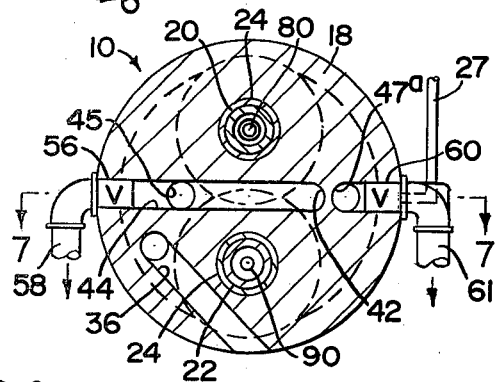
FIG. 6
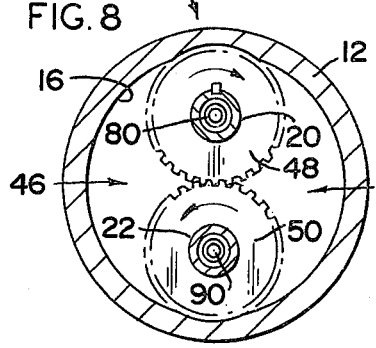
FIG. 8
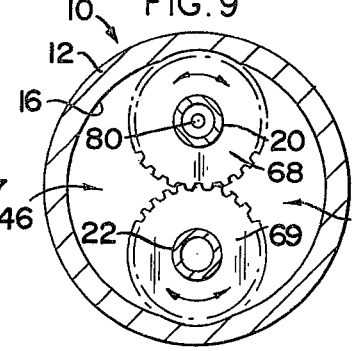
FIG. 9
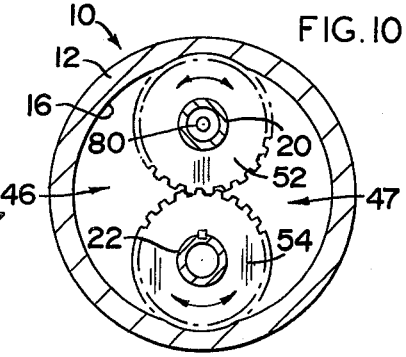
FIG. 10

TRANS-CLUTCH TORQUE CONVERTER

BACKGROUND OF INVENTION

Heretofore there have been many different types of torque converters that have been proposed and many of these have been produced and used commercially. Many of these torque converters as have been made heretofore have been relatively complex in design, or they have been costly to produce or costly to service and maintain in operation.

Gear pumps and clutches are well known but I propose to provide a gear pump-clutch-torque converter closed chamber unit wherein the primary function of the pressure fluid is to transfer power from an input shaft to an output shaft. The secondary purpose of the fluid is to move pairs of idler gears along the shafts so that they do either of three things: move the gears into contact with the input gears; move the gears into contact with the output gears; or, allow the gears to be out of contact with both input and output gears so that the idler gears may spin free. The third purpose of the fluid is to provide pressure that will hold the idler gears against either the input or output gears with sufficient force that the idler gears will rotate with the gears they are pressed against.

The general object of the present invention is to provide an improved torque converter including a clutch and gear-change means therein and wherein multi-speed output is readily obtained.

Another object of the invention is to provide a relatively compact, torque converter involving only relatively few parts therein and wherein the torque converter is basically a selective multiple gear pump-clutch means.

Another object of the invention is to provide a fluid transfer power system wherein the fluid is used to transfer power from the input shaft to the output shaft, to move idler gears along their positioning shafts and control the power transmitting actions thereof, and to use the pressure fluid for holding the idler gears in selected positions as clutch members.

Yet a further object of the invention is to provide a torque converter primarily involving at least three pairs of gears in a fluid power system for providing a multi-speed torque conversion action for transfer of power from an input to an output shaft.

Other objects of the invention relate to the use of multiple gear input means and multiple gear output means mounted on respective input and output shafts of a torque converter; to use hydraulic fluid and a gear-shift lever for controlling pressure liquid seepage in the system for controlling clutching pressures on the idler gears for controlled power transmission action in the torque converter; to combine a driven gear pump with an improved torque converter and transmit such pump output to the torque converter to drive the same; to provide multiple sets of gears in a closed torque converter chamber whereby substantially all fluid transferred by a driven pair of gears must return by the remaining gears providing drive for an output shaft coupled thereto; to use pressure fluid in the torque converter for moving idler gears along their mounting shafts so that such idlers can be moved to be a portion of the input gear means, to be in a neutral position, or to move the gears into contact and rotation with the output gears for controlling speed ratio changes in the torque converter; and to provide special control valves in a fluid flow circuit connected a gear pump fluid pressure supply portion of the torque converter assembly to a clutch and gear-change means in the output portion of the torque converter assembly for controlling power transmission action.

The foregoing and other objects will be made apparent as the specification proceeds.

Reference now is made to the accompanying drawings, wherein:

FIG. 1 is a plan view of the trans-clutch torque converter apparatus of the invention;

FIG. 2 is a side elevation of the torque converter apparatus of FIG. 1;

FIG. 3 is an end view, partially diagrammatic, of the right-hand end of the apparatus of FIG. 1;

FIG. 4 is a vertical cross section through the torque converter of FIG. 1;

FIG. 5 is a cross section taken on line 5—5 of FIG. 4 and showing the driven gear pump means of the apparatus of FIG. 1;

FIG. 6 is a vertical section taken on line 6—6 of FIG. 4 of part of the fluid circuit flow in the apparatus;

FIG. 7 is a fragmentary horizontal cross section, partly diagrammatic, taken on line 7—7 of FIG. 6;

FIG. 8 is a vertical section taken on line 8—8 of FIG. 4 in the torque converter portion of the apparatus with directions of rotation being indicated;

FIG. 9 is a fragmentary vertical section taken on line 9—9 of FIG. 4; and

FIG. 10 is a vertical section taken on line 10—10 of FIG. 4.

When referring to corresponding members shown in the drawings and described in the specification, corresponding numerals are used to facilitate comparison therebetween.

SUBJECT MATTER OF THE INVENTION

The multi-speed trans-clutch torque converter of the invention as one embodiment thereof comprises a housing, parallel input and output shafts in said housing, said input shaft being driven, a pair of interengaging input gears individually positioned on said shafts with only the gear on the input shaft secured thereto, an input and an output gallery being formed in a closed chamber of the housing by said gears, one or more pairs of operatively engaged idler gears journalled on said shafts with one gear of each pair being on one of said shafts, a pair of output gears individually positioned on said shafts with only the gear on said output shaft being secured to a said shaft, means to supply pressure fluid to said input gallery for transfer to said output gallery by said input gears, and means to move pairs of said idler gears axially to engage said input or said output gears and to retain them in their given positions, the output gears and gears associated therewith being driven by the pressure fluid returning to the input gallery.

With reference to the details of the structure shown in the drawings, the apparatus of the invention is referred to as a trans-clutch torque converter and is indicated as a whole by the numeral 10, but which apparatus could be referred to in other manners such as a multi-speed torque converter including gear pump and clutch means therein.

The drawing shows that a housing 12 is provided and it has a pair of aligned compartments or chambers formed therein with one compartment 14 being smaller than the second compartment 16, which second compartment houses the primary torque converter portion of the apparatus therein. The housing 12 is provided with a diametrically positioned partition 18 therein separating the compartments 14 and 16 from each other. An input shaft 20 and an output shaft 22 are journalled in the housing 12 by suitable members such as bushings 24 and with the shafts being parallel to each other and extending axially of and protruding from the compartments. These shafts 20 and 22 are tubular or at least have tubular sections formed therein for reasons to be hereinafter described.

The drawings show that a yoke 26 is suitably secured to and extends between exposed end portions of the shafts 20 and 22 for common axial movement thereof for variation in the drive output speed as hereinafter described.

As shown in FIGS. 4 and 5, a pair of gears 30 and 32 are carried by the input and output shafts, respectively, and with the gear 30, as shown in FIG. 5 being secured to the shaft 20 by a key 34 so that a gear pump is formed in the compartment 14. Fluid, normally a liquid for processing in this gear pump is supplied thereto, as by a bore 36 having a suitable source of liquid supplied thereto as from a sump (not shown) to supply fluid to this bore 36 for passage to an input gallery 38 of the gear pump shown in FIG. 5. The input shaft 20 is suitably driven in any conventional manner by means (not shown) whereby drive of the input shaft with the gears 30 and 32 meshing as shown, will force fluid from the input gallery 38 of the pump to the diametrically opposed output gallery 40 as these gears substantially fill the compartment 14, but have space at the peripheries of the gears for passage of fluid with the gear teeth by the rotation of the gears. Any suitable means (not shown) can be used to aid in sealing the sides of the gears 30 and 32 in the compartment 14, as required.

FIG. 6 shows a diagrammatic section through the partition 18 and it indicates that fluid output from the gallery 40, under pressure, goes through a bore 42 connecting to an axial bore 44 that connects by a bore 45 to an input gallery 46 formed in the second or torque converter compartment 16. In this torque converter compartment 16, a pair of driven engaging gears 48 and 50 are provided and positioned on the input and output shafts, respectively, and with the gear 48 being keyed to the input shaft as shown in FIG. 8 for rotation of these gears by the driven input shaft in the direction indicated. The torque converter also has a pair of engaging output gears 52 and 54 positioned on the shafts 20 and 22 in this compartment 16 and with only the output gear 54 being affixed to its carrier, the output shaft 22, as shown in FIG. 10. These output gears are appreciably longer than the driven input gears 48 and 50. Obviously these sets of gears 48 and 50, and 52 and 54 mesh with each other and they are adapted to function as gear pumps or gear motors in the enclosed portion of the housing forming the chamber 16.

FIG. 7 diagrammatically shows the pressure fluid flow from the compartment 14 to the compartment 16 and it indicates that a valve 56 is positioned at one end of the bore 44 and it is of an adjustable discharge pressure type whereby when excess pressure as hereinafter defined is set up in the input gallery 46 of the compartment 16, such valve 56 will open to permit pressurized liquid to discharge through a connector tube or line 58 which carries the excess fluid to a sump or similar container. A second pressure control valve 60 is provided in fluid communication with the output gallery 47 of the chamber 16. Such valve 60 and the valve 56 have multiple purposes. The valve 56 in the line or bore 44 between the pressurizing gear pump and the gallery 46 is set to maintain a pressure in the pump-motor compartment 16 sufficient to hold the idler gears against either the input or output gears so that there will be no slip of such gears when functioning as a clutch when fully engaged.

The valve 60 relieves pressure from the output gallery 47 under two circumstances: when the pressurizing pump is also to provide the pressure and volume of pressurized fluid for reversing the output drive direction and in which case the gallery 47 valve 60 partly relieves pressure and liquid flow from the input gallery 46 to and out of the gallery 47 for flow to the sump by tube 61 connecting to this valve 60.

Other functions of the valve 56 and 60 are used when an exterior means, such as an exterior chain drive has taken over the function of the torque converter of the invention in connecting the input and output shafts so that when the vehicle has obtained "high" or "overdrive" conditions, then the gallery valve 60 can be opened fully so that the pressurizing pump formed by the gears 30 and 32 has no back pressure and it merely pumps coolant and/or lubricant through the pump-motor compartment of the torque converter. In such a mode, the idler gears, as hereinafter described are free wheeling in neutral so that the trans-clutch operates at near the efficiency of a standard manual transmission.

The gears 30 and 32, as indicated, form a pressurizing gear pump, while the gears 48 and 50 in the torque converter compartment 16 likewise form, in effect, a gear pump that effectively transfers fluid under pressure from the input gallery 46 to the pressurized output gallery 47. Such gear pump formed by the gears 48 and 50 may be considered to be a gear motor driving liquid into the output gallery 47.

Now, as an important feature of the apparatus of the invention, the torque converter compartment 16 is provided with at least a pair of idler gears positioned between the gears 48 and 50, and 52 and 54. In this particular instance, a plurality of sets of idler gears 62, 63; 64, 65 through 78 and 79, to form nine pairs of inter-engaging idler gears in all, are freely positioned on and supported by the input and output shafts 20 and 22, respectively, as shown in the drawings. FIG. 9 indicates that all of such gears of such pairs of idler gears are journalled on and rotatable in relation to their positioning shafts.

As another important feature of the invention, it should be realized that these pairs of idler gears 62 and 63 through 78 and 79 are adapted to function as clutches or clutch plates in different speed converter requirements or positions of the torque converter apparatus of the invention. Hence, alternate sets of such gears 62 through 79 are made from the same tough material as is used in making clutch plates and/or brake linings whereby an abrasive, wear resistant material is used in forming these gears so that they can have both the functions of gears, but also can have the adhesiveness of plates or clutch discs when the gears are forced together by axially directed pressures applied to a side face of one of the gears. The gears may also have different pitch teeth in the alternate pairs of such gears to reduce leakage. The other alternate sets of gears are made from any suitable material.

In order to control the speed change ratios of the gear and clutch means provided in the trans-clutch or torque converter compartment 16, an axially directed rod or shaft 80 is positioned in that input shaft 20 to extend axially thereof and such rod may be suitably journalled or supported in the bore of the shaft and it positions an annular seal 82 at the axially inner end thereof. Such seal is rotably positioned on the rod 80 as by bearings 84 and with the seal 82 being of an axial extent as to cover more than one but not three of the drainage holes between gears 48 and 62, as shown in FIG. 4. By axial movement of the rod 80, the seal 82 can be brought into sealing engagement with any of the drainage holes between adjacent pairs of gears as mounted on the input shaft, as hereinafter described.

It should be understood that in the flow of pressurized fluid to and around the compartment 16, the pressurized fluid is at all times attempting to flow down between adjacent side faces of the gears in the sets 62 through 79 as slight axial movement of such gears on their carrier shafts is available. The fluid is free to seep or leak from the compartment through any of a series of openings 86 formed in the wall of the tubular input shaft 20. One or more of such holes or openings are formed in an annular series thereof at the axially spaced portions of such shaft representing the plane of the abutted faces of the gears as axially forced together on such input shaft. When radial flow of this pressurized liquid between adjacent faces of abutting gears is prevented by the seal 82, as between the gears 48 and 62 as shown in FIG. 4, then the pressurized liquid exerts an axially directed pressure to the right to force the gear 62 into contact with the gear 64, the gear 64 into contact with the gear 66, etc., until the end gear 78 is forced against the adjacent end of the output gear 52 whereby a unitary gear in effect is formed therebetween. All of such gears, being free to rotate on the input shaft, will be driven or rotated by pressurized liquid in the output gallery 47 being forced to flow back to the input gallery 46 and drive the gears 62 through 78 and 52 in the opposite direction to that of the gear 48 as indicated in sections 8, 9 and 10 in the drawings. When shifting gears, two adjacent sets of, or two adjacent openings 86, must be covered for an instant so that the gear being shifted will not be clutched on both sides at one time.

Now by controlling the relative widths of the gears 48 and 50 in relation to the output gears 52 and 54 and the inter-connecting idler gears 62 through 79, one can determine the speed ratio or drive of the output shaft 22 in relation to the driven speed of the input shaft. Assuming that the idler gear 62 and its associated gear 63 were the only idler gears present and such idler gear was one of the same width and fluid carrying capacity as the gears 48 and 50 and that the output gear set 52 and 54 also was of the same width and fluid carrying capacity, when such idler gear 62 would be pressed against and turning with the input gear in the closed circuit apparatus of the invention, then the input gear 48 and idler gear 62 combination would deliver twice the volume of liquid per revolution into output gallery 47 that the output set of gears 52 and 54 would be capable of removing. Therefore, the output gears must rotate twice for each revolution of the input gears and the gear box-clutch is operating at a 1 to 2 input to output ratio. If, however, we should cause the idler gear to disengage from the input gear (in passing through neutral on its way to form contact with the output gear 52) and into firm contact therewith, then the torque converter, gear box-clutch or trans-clutch apparatus of the invention as positioned in the compartment 16 would have passed through the following operations: declutch; neutral; reclutch; and ultimate conversion of the input-output ratio from the initial one to two ratio to an opposite value of two to one. From the foregoing, it obviously will follow it is only necessary to subdivide the idler gear, or gear sets so that portions of it may be selectively engaged with either the input, or output gear sets, or neither, to have a variety of input to output ratios (and with the intermediate clutching operations as required) to provide a very efficient multi-speed coupling means for connecting the input and output shafts in this torque converter compartment 16. The subdivision of the idler gears is as simple as slicing them into thinner gears to make the trans-clutch "gear box" to contain mechanism for a range of ratios limited only by practical mechanical considerations.

The output shaft 22 has a rod 90, seal member 92 and bearing 94 positioned therein like the members in the input shaft. Such rod 90 is moved as a unit with the rod 80 by the yoke 26 at all times to have the seals 82 and 92 functioning at the same set of idler gears and be moved simultaneously.

In use of the apparatus of the invention, assume that the valve 60 is closed, and the pressure release valve 56 is set for 75 lbs. psi, as the input and output galleries 46 and 47 of the compartment 16 are completely filled with liquid, and with the orifices or openings 86 between the gear sets 48 and 50, and 62 and 63, being closed, this results in a sidewise pressure being applied to or between these gear sets but with zero lbs. psi being applied between the remaining sides of the gear sets 62, 64, 66, up to and including the gear 52. Hence, all of the idler or transfer gear sets 62, 64 through 78 are forced to the right, as shown in FIG. 4, into clutching contact with the set of output gears 52 and 54. When this occurs, the torque converter compartment 16 is in effect the enclosure for two separate sets of gears, and with the input gear set 48, 50 rotating with the input shaft as a gear pump, this pressurizes the output gallery 47 and tends to reduce pressure in the input gallery 46. This results in the gear sets in the compartment 16 being forced by the differential pressures to act as a gear motor turning in the opposite direction. Naturally, rotation of the output gears drives the output shaft 22 because the gear 54 is keyed to such shaft and so fluid is returned by the gear motor from the gallery 47 to the input gallery 46.

In order to reverse the direction of rotation of the output shaft 22, it is only necessary to change the pressure differential between the input and output galleries 46 and 47 so that the gallery 46 becomes the high pressure region. Since the input gear set 48, 50 is only half the width of the pressure supply gear pump provided by the gears 30 and 32, the gear set 48 and 50 in the torque converter chamber 16 can only carry half of the fluid from the gallery 46 to the gallery 47 as it has only the capacity to process half of such output fluid from the pressure pump portion of the apparatus. Now, by setting the valve 60 to relieve the pressure in the gallery 47 slightly, as having it set to about 50 lbs. psi, so that clutching pressure is maintained, the surplus of fluid delivered into the gallery 46 and seeking to flow to the output gallery 47 will rotate the gear motor or output gear set in an opposite direction to that normally obtained. Such action is obtained by opening the valve 60 and having the gear shift levers in the position as indicated in FIG. 4.

In order to return to the forward direction of operation of the output shaft 22, this only requires that the valve 60 be closed.

In moving the gear shift controlled yoke 26, it will be seen that when the seals 82 are moved over to a position sealing the openings between the set of gears 78, 79 and 52, 54, at that time then the effective length of the gears 48 and 50 plus the remaining sets of gears 62 through 78 is equal to the actual length of the gears 52 and 54. At that time, a 1 to 1 drive ratio is achieved and it normally would be desirable to transfer to a direct drive outside the torque converter of the invention and this can be done in a conventional manner with other means (not shown). After such transfer, the valve 60 is opened so that the pressure pump no longer pressurizes the torque converter compartment 16 in any manner, but it only supplies cooling and lubricating fluid until downshifting in the torque converter of the invention is desired. When direct drive, external of the torque converter is in effect, the idler gears are free wheeling in neutral.

While FIG. 4 cannot show this clearly, the various sets of gears 62, 63, through 78 and 79 are positioned on their carrier shafts 20 and 22 so as to be free for slight axial movement thereon such as about 0.005 inch. This axial movement permits the clutching and declutching actions of these transfer gears as described herein. Thus, it provides for one set of idler gears to be spaced slightly axially from its adjacent set to expose one of the openings, or orifices 86 in each of the shafts 20 and 22 for seepage of the pressurized liquid from the system and to set up the axially directed clutching pressures against the associated idler or transfer gears to obtain the desired output speed.

While the present apparatus shows control of the volumes of fluid processed by the axial length of the gears provided, the volumes may be controlled by variations in gear teeth size and spaces therebetween as well, if desired. The output of the gears 30 and 32 or other pressure fluid input means must be greater than that of the gears 48 and 50.

A control arm 27, diagrammatically shown in the drawings, or other suitable means engages the valve 60 to control the opening and action thereof. A bore 47a connects the gallery 47 to the valve 60.

In order for the torque converter portion of the apparatus as contained in the compartment 16 to function as a transmission-clutch combination, the apparatus of the invention must be constantly pressurized with input fluid as from the gears 30 and 32. Usually fluid is being selectively leaked out of the enclosure 16 through an orifice or hole 86 to effect the idler or transfer gear control, as previously described.

Any known shift control means can connect to the yoke 26 to control its position.

From the foregoing, it is seen that an efficient, practical fluid trans-clutch torque converter has been provided and that the objects of the invention have been achieved.

While one complete embodiment of the invention has been disclosed herein, it will be appreciated that modification of this particular embodiment of the invention may be resorted to without departing from the scope of the invention.

What is claimed is:
1. A trans-clutch torque converter comprising
a housing having two aligned chambers therein,
parallel input and output shafts journalled in the housing and extending through said chambers,
a driven gear pump in one chamber of the housing with the gears thereof individually mounted on said shafts,
a first pair of interengaging input gears positioned on said shafts in said second chamber with the gear on said input shaft being secured thereto,
a pair of interengaging output gears mounted on said shafts in said second chamber with the gear on said output shaft being secured thereto,
at least one pair of idler gears on said shafts between the other sets of gears thereon,
hydraulic fluid galleries being formed in both of said chambers, and
connecting means for transferring the liquid output of said gear pump to the input gallery of the second chamber for transfer to the output gallery of said second chamber by rotation of said first pair of gears in one direction and return to said input gallery by drive of said pair of output gears in the opposite direction.

2. A trans-clutch torque converter as in claim 1 where a plurality of pairs of engaging idler gears are journalled on said shafts and have slight axial movement thereon, said pairs of idler gears being adapted to be forced into clutching engagement with each other and with said input or said output gears.

3. In a trans-clutch torque converter as in claim 1 where
a plurality of pairs of interengaging idler gears are freely positioned on said shafts intermediate said first pair of gears and said output gears, said shafts are tubular and have an orifice opening therein intermediate each pair of said interengaging idler gears, and
common shift means including an axially movable rod in each of said shafts and carrying a seal on the end thereof for sealing a set of openings between selected adjacent pairs of said gears, the pressure fluid in said second compartment producing axial pressures on the sides of pairs of gears to lock them to the gears adjacent their opposite sides.

4. A torque converter as in claim 1 where
a valve means is provided in said connecting means to control the pressure of liquid supplied to said second chamber.

5. A trans-clutch torque converter as in claim 1 where said gear pump has greater capacity than said input gears.

6. A trans-clutch torque converter as in claim 1 where
a plurality of pairs of interengaging idler gears are freely positioned on said shafts intermediate said first pair of gears and said output gears, said shafts are tubular and have a set of openings therein intermediate each pair of said interengaging idler gears,
common shift means including a rod in each of said shafts and carrying a seal on the end thereof for sealing an opening between selected adjacent pairs of said gears, the pressure fluid in said second compartment producing axial pressures on the sides of pairs of gears to lock them to the gears adjacent their opposite sides, and
a pressure relief valve is present in the output gallery of said second chamber.

7. In a multi-speed torque converter,
a housing, parallel input and output shafts in said housing, said input shaft being driven, a pair of input gears individually positioned on said shafts with only the gear on the input shaft secured thereto, an input and an output gallery being formed in the housing by said gears, a plurality of pairs of operatively engaged idler gears journalled on said shafts with one gear of each pair being on one of said shafts, a pair of output gears individually positioned on said shafts with only the gear on said output shaft being secured to said shaft, means to supply pressure liquid to said input gallery for transfer to said output gallery by said input gears, and means to move pairs of said idler gears axially to engage said input or said output gears and to retain them in their given positions.

8. In a torque converter as in claim 7 where said pressure supply means comprises a gear pump the gears of which are positioned on said shafts in a separate chamber in said housing.

9. In a multi-speed torque converter as in claim 7 where said shafts are tubular and have an orifice opening therein intermediate each pair of said interengaging idler gears, said idler gears being free for limited axial movement on said shafts, and common shift means including a rod in each of said shafts and carying a seal on the end thereof for sealing the said openings between selected adjacent pairs of said gears and producing axial pressures on said pairs of gears to lock gears on each shaft into units by clutch action therebetween.

10. In a multi-speed torque converter as in claim 7 where said input gears having a smaller fluid capacity than the rate of supply of pressure liquid by said supply means, and a valve means connects to said output gallery to provide reduced pressure therein for reverse drive of said output shaft.

* * * * *